United States Patent
Dangler et al.

(10) Patent No.: US 10,992,979 B2
(45) Date of Patent: Apr. 27, 2021

(54) MODIFICATION OF ELECTRONIC MESSAGING SPACES FOR ENHANCED PRESENTATION OF CONTENT IN A VIDEO BROADCAST

(71) Applicant: International Business Machines Corporation, Armonk, NY (US)

(72) Inventors: John R. Dangler, Rochester, MN (US); David T. Nelson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 16/208,801

(22) Filed: Dec. 4, 2018

(65) Prior Publication Data

US 2020/0177943 A1  Jun. 4, 2020

(51) Int. Cl.
*H04N 21/414* (2011.01)
*H04N 21/234* (2011.01)
(Continued)

(52) U.S. Cl.
CPC . *H04N 21/41415* (2013.01); *H04N 21/23418* (2013.01); *H04N 21/25841* (2013.01); *H04N 21/812* (2013.01)

(58) Field of Classification Search
CPC ......... A63B 2220/806; G06K 9/00724; G06K 9/3258; G03B 21/10; G03B 21/56; G03B 21/62; H09N 9/12; H09N 9/3147; H04N 9/3147; H04N 5/7441; H04N 5/74; H04N 5/66; H04N 21/4145; H04N 21/4223; H04N 21/25883; H04N 21/44213; H04N 21/814; H04N 21/4882; H04N 21/23418; H04N 21/812; H04N 21/41415; G03N 21/28;
(Continued)

(56) References Cited

U.S. PATENT DOCUMENTS

| 5,764,306 A | 6/1998 | Steffano |
| 8,862,500 B1 * | 10/2014 | Mayfield ............... G06Q 30/02 |
| | | 705/14.58 |

(Continued)

FOREIGN PATENT DOCUMENTS

| WO | 02095995 A2 | 11/2002 |
| WO | 2015117681 A1 | 8/2015 |
| WO | 2016023953 A1 | 2/2016 |

*Primary Examiner* — Ngoc K Vu
(74) *Attorney, Agent, or Firm* — Cantor Colburn LLP; Tihon Poltavets

(57) ABSTRACT

Methods, systems and computer program products for providing modifications to an electronic messaging space to enhance presentation of content in a video broadcast are provided. Aspects include receiving electronic messaging space data including a location and a message content for each of a plurality of electronic messaging spaces. Aspects also include determining that a target electronic messaging space is visible in a video broadcast. Responsive to determining a location depicted by the video broadcast, aspects include determining a location of the target electronic messaging space and a message content displayed by the target electronic messaging space. Aspects also include causing the target electronic messaging space to modify the display of the message content for improved presentation via the video broadcast.

20 Claims, 9 Drawing Sheets

(51) Int. Cl.
*H04N 21/81* (2011.01)
*H04N 21/258* (2011.01)

(58) Field of Classification Search
CPC ... H04L 51/046; H04L 51/10; H04L 51/4223; G06F 17/30598; G06Q 30/0251; G06Q 30/0264; G06Q 30/0253
See application file for complete search history.

(56) References Cited

U.S. PATENT DOCUMENTS

| | | |
|---|---|---|
| 9,327,178 B2 | 5/2016 | Grigsby et al. |
| 10,027,905 B2* | 7/2018 | Salin ................. H04N 5/272 |
| 2007/0199017 A1 | 8/2007 | Cozen et al. |
| 2012/0311629 A1 | 12/2012 | Zaslavsky et al. |
| 2013/0170819 A1* | 7/2013 | Dykeman .......... H04N 5/44543 386/299 |
| 2015/0026718 A1 | 1/2015 | Seyller |
| 2015/0084838 A1* | 3/2015 | Chang ................. G06F 3/1454 345/2.1 |
| 2015/0139488 A1 | 5/2015 | Dharssi et al. |
| 2015/0326892 A1 | 11/2015 | Mccoy et al. |
| 2016/0066012 A1* | 3/2016 | Friedlander ........ H04N 21/4882 725/34 |
| 2016/0117722 A1* | 4/2016 | Garcia ................. G06Q 50/10 705/14.49 |
| 2018/0020247 A1 | 1/2018 | Zhang et al. |

* cited by examiner

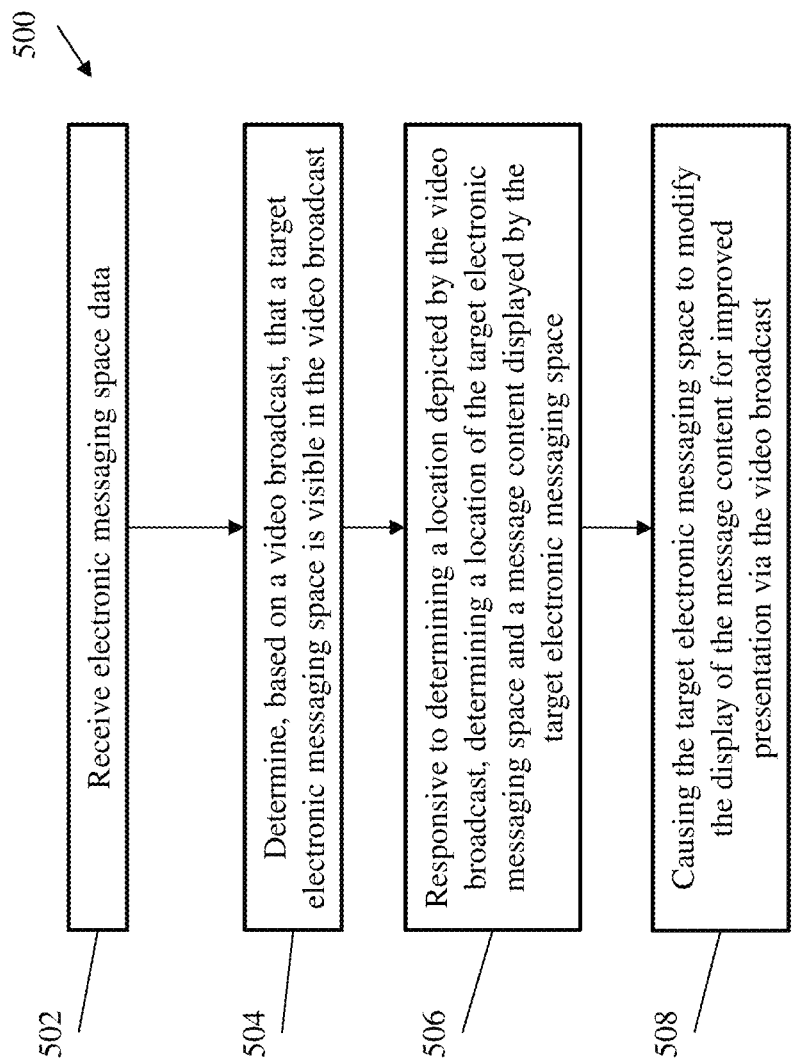

MODIFICATION OF ELECTRONIC MESSAGING SPACES FOR ENHANCED PRESENTATION OF CONTENT IN A VIDEO BROADCAST

BACKGROUND

The present invention generally relates to electronic advertisements, and more specifically, to providing modifications to an electronic messaging space to enhance the presentation of content in a video broadcast.

Companies spend a lot of money on public messaging spaces, such as billboards, to present advertisements or other messaging to the public. It is not uncommon for public spaces containing such advertisements to be filmed and broadcast by television networks, online streaming services, or other such video distribution networks. For example, sports arenas where sports are regularly filmed commonly include electronic signage and popular city centers such as Times Square that can include multiple electronic billboards may be the sight of frequent news broadcasts. While the owners of the advertising spaces may receive extra viewership of their advertisements during such broadcasts, they often do not receive the full benefit of the video broadcast exposure because the billboards and advertisements are generally not likely to be oriented to face the camera or configured for optimal viewing on a video broadcast.

SUMMARY

Embodiments of the present invention are directed to a computer-implemented method for providing modifications to an electronic messaging space to enhance the presentation of content in a video broadcast. A non-limiting example of the computer-implemented method includes receiving electronic messaging space data. The electronic messaging space data includes a location and a message content for each of a plurality of electronic messaging spaces. The method also includes determining, based on a video broadcast, that a target electronic messaging space is visible in the video broadcast. The target electronic messaging space is one of the plurality of electronic messaging spaces. Responsive to determining a location depicted by the video broadcast, the method includes determining a location of the target electronic messaging space and a message content displayed by the target electronic messaging space. The method also includes causing the target electronic messaging space to modify the display of the message content for improved presentation via the video broadcast.

Embodiments of the present invention are directed to a system for providing modifications to an electronic messaging space to enhance the presentation of content in a video broadcast. The system includes a memory having computer readable computer instructions, and a processor for executing the computer readable instructions. The computer readable instructions include instructions for receiving electronic messaging space data. The electronic messaging space data includes a location and a message content for each of a plurality of electronic messaging spaces. The computer readable instructions also include instructions for determining, based on a video broadcast, that a target electronic messaging space is visible in the video broadcast. The target electronic messaging space is one of the plurality of electronic messaging spaces. Responsive to determining a location depicted by the video broadcast, the computer readable instructions include instructions for determining a location of the target electronic messaging space and a message content displayed by the target electronic messaging space. The computer readable instructions also include instructions for causing the target electronic messaging space to modify the display of the message content for improved presentation via the video broadcast.

Embodiments of the invention are directed to a computer program product for providing modifications to an electronic messaging space to enhance the presentation of content in a video broadcast, the computer program product comprising a computer readable storage medium having program instructions embodied therewith. The computer readable storage medium is not a transitory signal per se. The program instructions are executable by a processor to cause the processor to perform a method. A non-limiting example of the method includes receiving electronic messaging space data. The electronic messaging space data includes a location and a message content for each of a plurality of electronic messaging spaces. The method also includes determining, based on a video broadcast, that a target electronic messaging space is visible in the video broadcast. The target electronic messaging space is one of the plurality of electronic messaging spaces. Responsive to determining a location depicted by the video broadcast, the method includes determining a location of the target electronic messaging space and a message content displayed by the target electronic messaging space. The method also includes causing the target electronic messaging space to modify the display of the message content for improved presentation via the video broadcast.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flow diagram of a method for providing modifications to an electronic messaging space to enhance the presentation of content in a video broadcast according to one or more embodiments of the invention;

Figure 1:
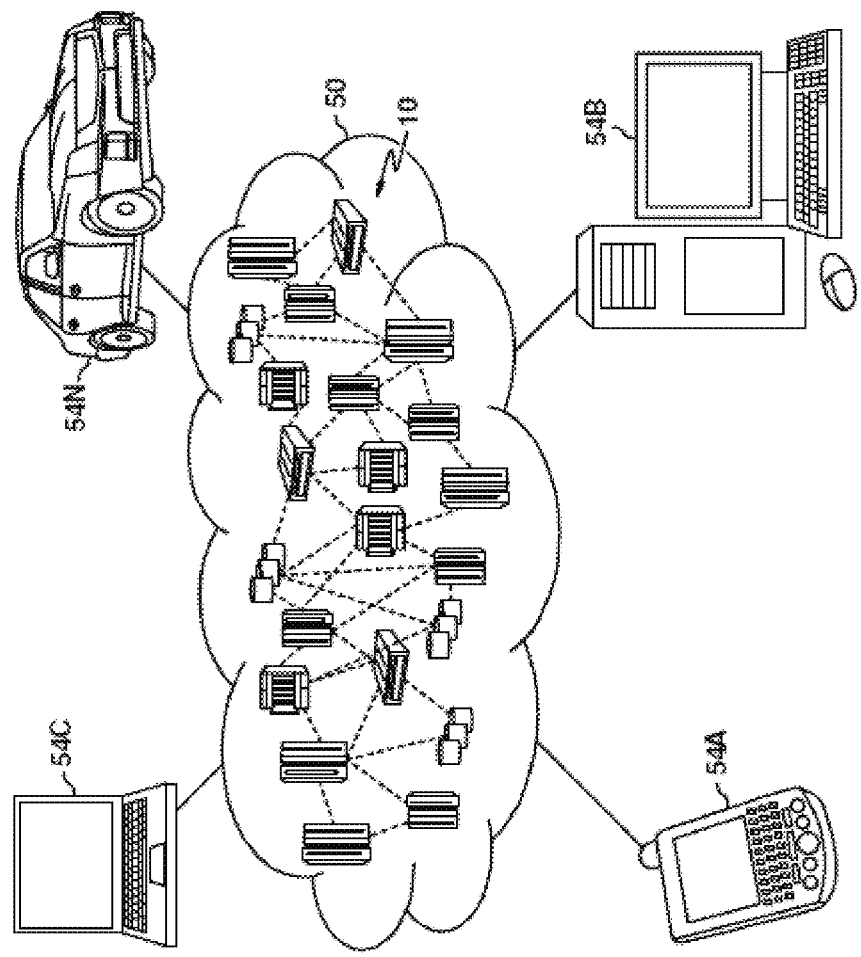
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
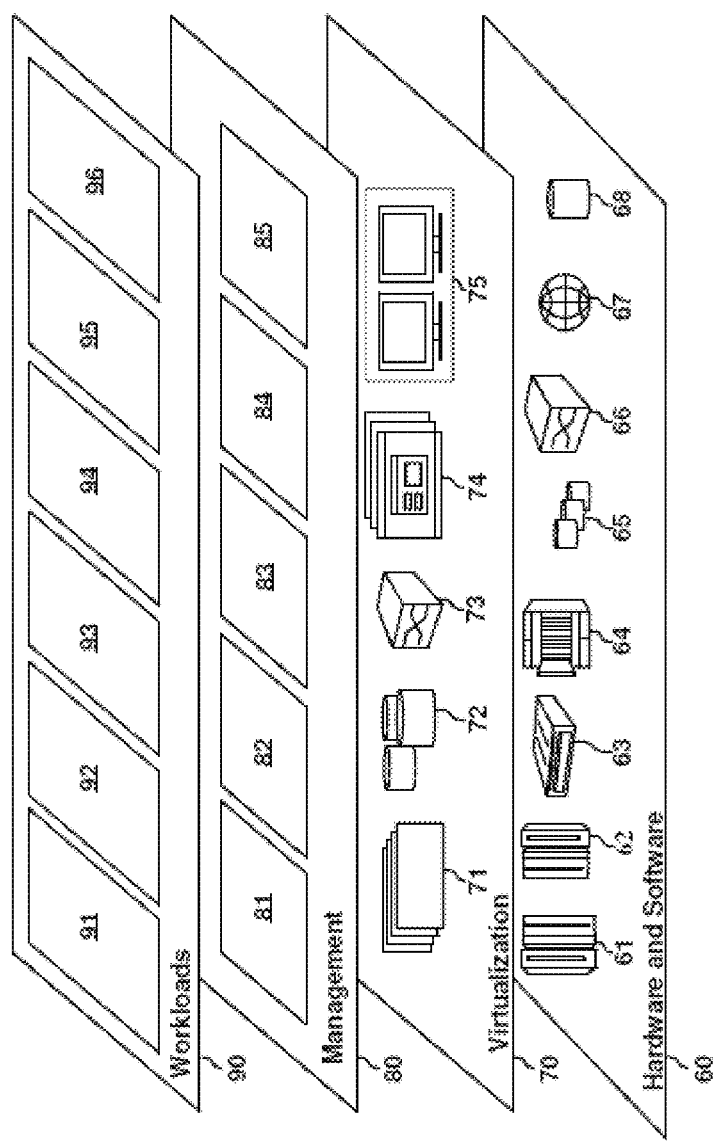
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing modifications to an electronic messaging space to enhance the presentation of content in a video broadcast 96.

Figure 3:
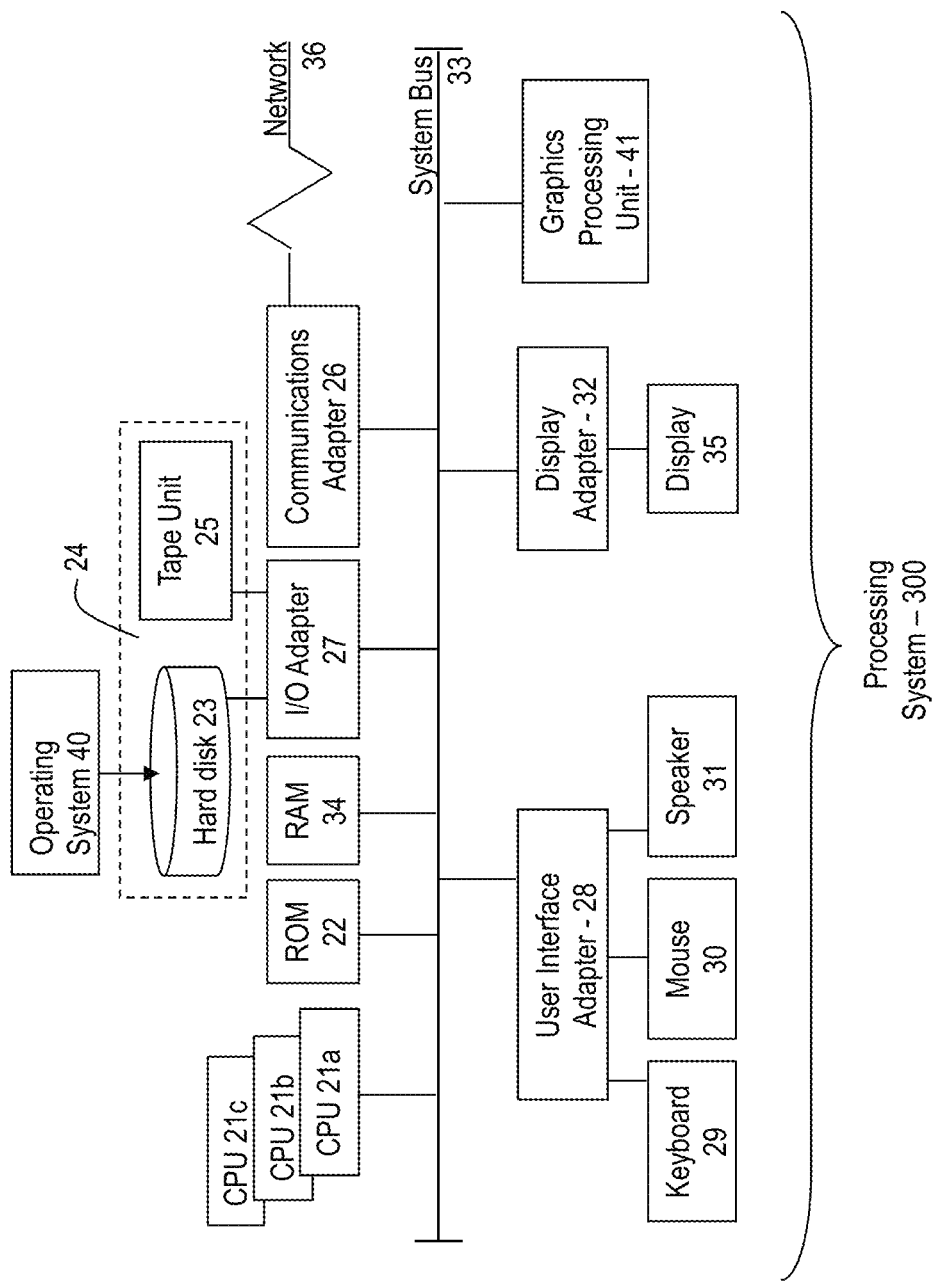
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing modifications to an electronic messaging space to enhance the presentation of content in a video broadcast is provided. In exemplary embodiments, the system can include a plurality of electronic messaging spaces, such as electronic billboards or banners, with known geographic locations. The system can be configured to determine when one of these electronic messaging spaces is viewable in a video broadcast and can identify which electronic messaging space (i.e., which location) is viewable in the video broadcast. For example, if a football game is being broadcast on television, the system may know that one or more electronic billboards or banners are positioned within the football stadium that is the subject of the broadcast. Based on the video broadcast, the system can then initiate modifications to the electronic messaging space and/or the displayed message content to enhance the presentation of the message content via the video broadcast. For example, if possible, the system may rotate an electronic billboard so that the face of the billboard is perpendicular to the direction the camera is facing to maximize the surface area of the billboard that is shown on the video broadcast. Similarly, the system may activate or deactivate one or more lights associated with the electronic messaging space to provide better illumination of the messaging space on the video broadcast. Further, the system can also modify the message content displayed by the electronic messaging space to enhance its viewability on the video broadcast. For example, if the electronic messaging space that is positioned at an angle to camera such that the message content is skewed or hard to see, the system may alter the electronic display of the message on the electronic messaging space to change its orientation, size and/or content for improved viewing on the video broadcast. In some embodiments, the system may receive information relating to one or more devices upon which the video broadcast is being viewed, and may modify the electronic messaging space and/or the displayed message content to attempt to optimize presentation on a particular type of device. For example, the system may make a first set of modifications for optimized viewing on a television, but may make a different set of modifications for optimized viewing on a smartphone having a much smaller screen.

Figure 4:
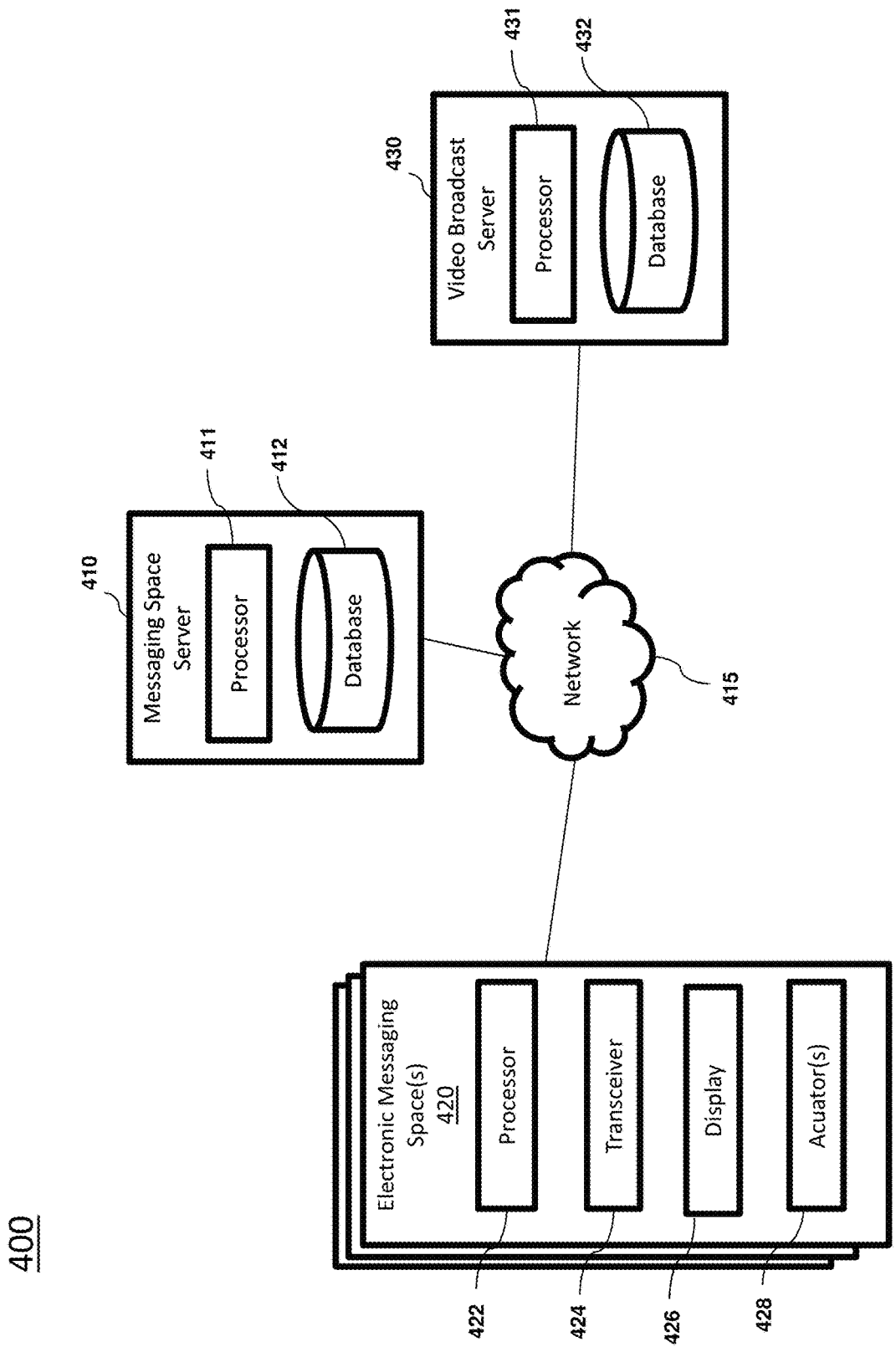
FIG. 4 depicts a system upon which providing modifications to an electronic messaging space to enhance the presentation of content in a video broadcast may be implemented according to one or more embodiments of the present invention.

Turning now to FIG. 4, a system 400 for providing modifications to an electronic messaging space to enhance the presentation of content in a video broadcast will now be described in accordance with an embodiment. The system 400 includes a messaging space server 410 in communication with electronic messaging space(s) 420 and video broadcast server 430 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.).

In exemplary embodiments, the messaging space server 410 can be configured to identify an electronic messaging space 420 being displayed in a video broadcast and modify the electronic messaging space 420 and/or the display of message content by the electronic messaging space 420 to attempt to optimize or enhance presentation of the message content in the video broadcast. Messaging space server 410 can include a processor 411 for executing the functionalities described herein and a memory 412 (or other storage) for storing data used in performing such functionalities. According to some embodiments, the messaging space server 410 stores electronic messaging space data, which can include a list of all electronic messaging spaces 420, their respective locations, message content, and configurations. A configuration can refer to, for example, an orientation of an electronic messaging space 420 (e.g., relative to a camera), external lighting associated with the electronic messaging space 420, and the size, angle, orientation, color, content or other aspects of the message displayed by the electronic messaging space 420. Although this disclosure generally refers to modifications of a messaging space that is electronic in nature, the disclosure is not intended to be limited to electronic messaging spaces, but rather it is contemplated that some of the techniques described herein may also be applicable to non-electronic messaging spaces, such as traditional billboards or billboards incorporating mechanically adjustable features. For example, the system can be configured to identify the presence of a non-electronic billboard in a video broadcast and cause the billboard configuration to be adjusted relative to the viewpoint of the camera by for example, rotating the billboard, adjusting lighting associated with the billboard, or activating a mechanical function or display associated with the billboard.

According to some embodiments, the messaging space server 410 can be configured to receive video broadcasts, schedules, and associated metadata from video broadcast server 430, which the messaging space server 410 can use to identify electronic messaging space(s) 420 that are being shown in a video broadcast. According to various embodiments, the messaging space server 410 may determine that an electronic messaging space 420 is being shown in a video broadcast or that a future video broadcast is predicted to show an electronic messaging space 420 by various different methods. For example, in some embodiments, messaging space server 410 may receive a schedule of broadcast events with known locations, for example, it may be known that a football game at a particular stadium will be broadcast between 8:00 pm and 11:00 pm on a given day, and the messaging space server 410 may know, based on the stored messaging space data, that one or more electronic messaging space(s) 420 are positioned within the stadium. According to some embodiments, the system (e.g., messaging space server 410) can predict that one or more electronic messaging space(s) 420 will be shown in a video broadcast by, for example, identifying the location(s) of the one or more electronic messaging space(s) in relation to a determined location of a current broadcast. For example, if an electronic messaging space 420 is positioned in Times Square and a TV news reporter is broadcasting a news segment filmed walking down a street that is adjacent to Time Square, the system may predict that the broadcast will show the electronic messaging space 420 positioned in Times Square. Determination of the location of the live broadcast can be achieved by for example, receiving metadata associated with the broadcast (e.g., GPS data associated with the newscaster and/or cameraman), by applying image recognition techniques to the broadcast (e.g., to identify known landmarks, street names, etc.), performing voice or text analysis to detect mentions of location, or other such methods of identifying a location of a video broadcast. In some embodiments, each electronic messaging space 420 may display a visual identifier (e.g., similar to a barcode or QR code) and messaging space server 410 can apply image recognition techniques to video broadcast(s) to identify the presence of a particular electronic messaging space 420. According to some embodiments, messaging space server 410 can perform image recognition analysis on the video broadcast to determine the location depicted by the video broadcast and determine that a location associated with the target electronic messaging space is within a predetermined distance of the determined location depicted by the video broadcast. For example, messaging space server 410 may perform image analysis of a news broadcast and based on identifying one or more landmarks, words (e.g., street or building signs), or other features, may determine the general location depicted by the broadcast (e.g., Times Square).

According to some embodiments, upon determining that a particular electronic messaging space 420 is being shown in a video broadcast, the messaging space server 410 may determine a viewability profile of the electronic messaging space 420. In other words, the messaging space 410 can be configured to determine the approximate angle of the face of the electronic messaging space 420 relative to the direction the camera of the broadcast is pointing, the lighting characteristics of the electronic messaging space 420, the portion of the electronic messaging space 420 that is in frame of the video, and the viewability of the displayed message content in terms of angle, size, readability, brightness and color of the message content. According to some embodiments, the messaging space server 410 may be configured to perform an analysis of the message content displayed in the video broadcast in comparison to the stored message content to determine differences in the two and identify aspects that should be modified to attempt to either make the message content displayed in the video broadcast more closely match the stored message content or alter the message of the message content so that a message is more adequately displayed in the video broadcast. For example, if the original message content contains a message with ten words, but the messaging space 410 is too small and/or too far away from the camera for all ten words to be adequately displayed such that they would be readable, the messaging space server may alter the message content to for example, reduce the number of words and/or replace one or more words with an image. According to some embodiments, upon determining that a modification of the messaging space 410 and/or message content may be required, the message space server 410 may notify a user associated with the messaging space and execute modifications in response to user inputs by the user. For example, if the system determines that the amount of content that can be viewably displayed should be reduced, the system may present a user with an option to, for example, reduce the number of words displayed or replace the words with an image and the user may input a selected modification. Similarly, in some embodiments, if the system predicts that a messaging space is likely to be shown in a future broadcast, the messaging space server 410 may notify a user associated with the messaging space and allow the user to specify changes in content of the messaging space.

This may allow an owner of an electronic billboard to create a business arrangement where an electronic billboard is leased to a first licensee for normal usage, but can temporarily switch content to that of a second licensee when the billboard will be broadcast on TV or the internet.

After the messaging space server 410 determines what modifications should be made to the electronic messaging space 420 and/or the message content displayed by the electronic messaging space 420, the messaging space server 410 can generate instructions representing these modifications to transmit to the electronic messaging space 420 to execute the changes. For example, the messaging space server 410 may instruct the electronic messaging space 420 to rotate towards the camera, change internal or external lighting conditions, or display message content that has received modifications to its perspective, perceived angle, colors, brightness, the content of the message or images or other such aspects of the message content.

According to some embodiments, messaging space server 410 may receive information associated with one or more user devices being used to view the video broadcast, from for example video broadcast server 430. In some embodiments, messaging space server 410 can determine modifications to make to the electronic messaging space(s) 420 and/or the message content displayed by the electronic messaging space(s) 420 based on the characteristics of one or more user devices being used to view the video feed. For example, if messaging space server 410 knows that 90% of the user devices being used to view the video broadcast are smartphones and only 10% are televisions, messaging space server 410 may determine modifications to the electronic messaging space 420/message content that are designed to optimize viewing on a smartphone, which typically has a much smaller display screen than a television.

In exemplary embodiments, electronic messaging space(s) 420 can include, but are not limited to electronic billboards and electronic banners. Electronic billboards can be free standing or attached to a building. In some embodiments, electronic banners may, for example, encircle the interior of a sports arena. An electronic messaging spaces 420 can include a processor 422 for executing modification instructions provided by messaging space server 410, a transceiver 424 (or other communication interface) for communicating with messaging space server 410, an electronic display 426 (e.g., a video screen) for displaying message content and may include one or more actuators 428 for changing the rotation or positioning of the electronic messaging space 420.

In exemplary embodiments, video broadcast server(s) 430 can include, a processor 431 for processing video data and a memory 432 for storing data. Video broadcast server(s) include a communication interface that allows for communication with messaging space server 410. Video broadcast server 430 may receive live video recordings from one or more a remote cameras, and may provide the broadcasts to messaging space server 410. Video broadcast server 430 may be associated with a television network, an online video streaming service, a social network that enables video streaming, or any other such organization that facilitates the broadcast of live video content. According to some embodiments, video broadcast server 430 can transmit one or more video broadcasts and associated metadata to messaging space server. In some embodiments, metadata may include location data that represents the location at which a live broadcast is being recorded. In some embodiments, the metadata may include camera positions and orientations that messaging space server 410 may use in determining modifications to electronic messaging space(s) and message content.

Turning now to FIG. 5, a flow diagram of a method 500 for providing modifications to an electronic messaging space to enhance the presentation of content in a video broadcast are provided in accordance with an embodiment is shown. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 500 begins at block 502 and includes receiving electronic messaging space data. The electronic messaging space data can include a location and a message content for each of a plurality of electronic messaging spaces.

Figure 6A:
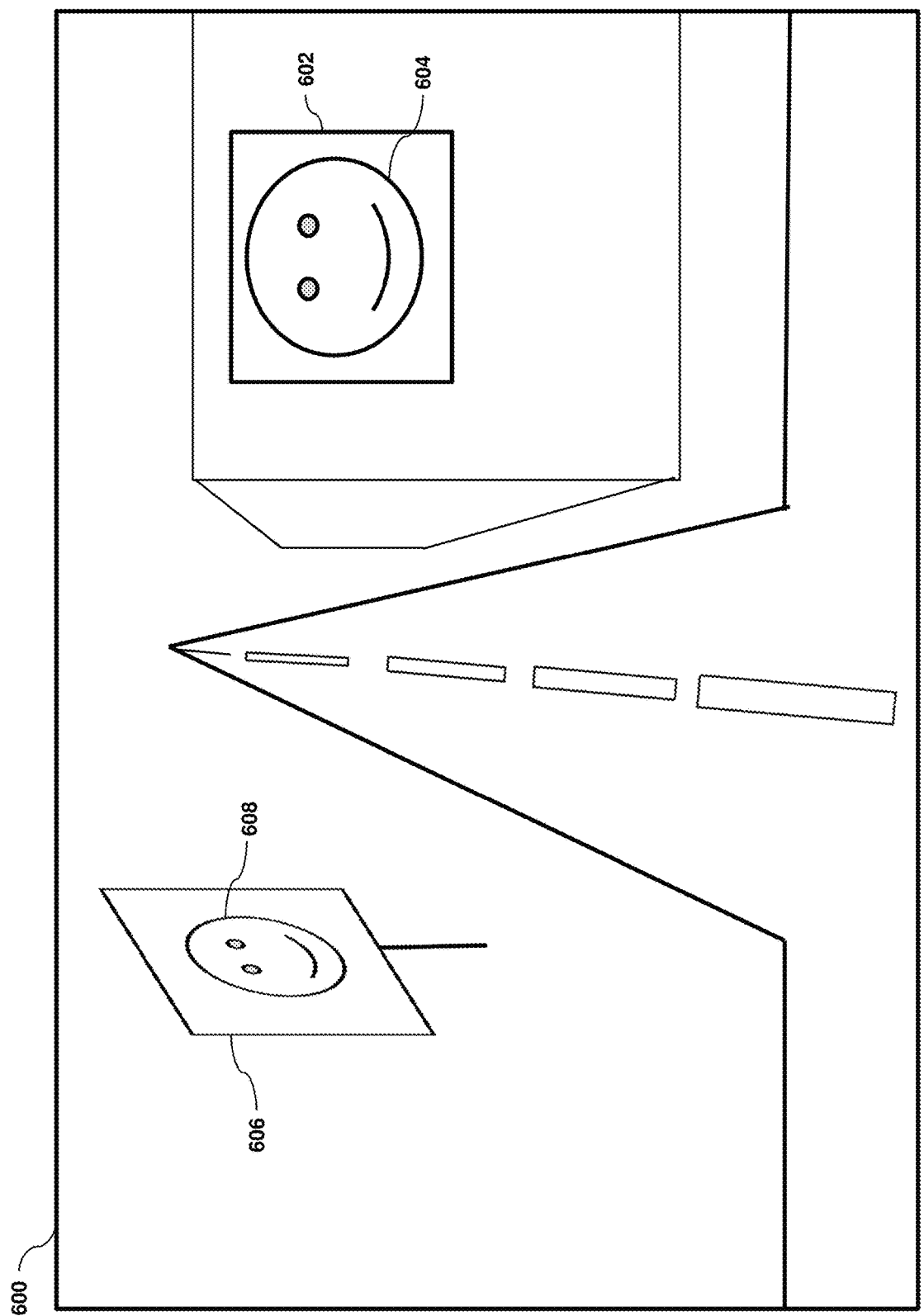
FIG. 6A depicts an example electronic messaging space according to one or more embodiments of the invention.

Next, as shown at block 504, the method includes determining, based on a video broadcast, that a target electronic messaging space is visible in the video broadcast. Alternatively, the system may predict, based on the video broadcast, that a target electronic messaging space will be visible in the near future in the video broadcast as described previously above. The target electronic messaging space can be one of the plurality of electronic messaging spaces. For example, FIG. 6A depicts an example video broadcast 600 (e.g., as shown on a television screen) that depicts a first electronic messaging space 602 displaying a first message content 604 and a second electronic messaging space 606 displaying a second message content 608. As shown, the first messaging space 602 is an electronic billboard that is positioned approximately perpendicularly to the direction of the camera, whereas the second messaging space 606 is positioned at an angle to the camera causing the message content 608 to be displayed at a skewed perspective relative to the position of the camera. In this example, the system (e.g., messaging space server 410) may determine that the first electronic messaging space 602 and the second electronic messaging space 606 are visible in the video broadcast.

According to some embodiments, determining that the target electronic messaging space is visible in the broadcast can include receiving a broadcast schedule comprising a list of scheduled broadcast events, each broadcast event being associated with a known location and time range, determining that a location of a broadcast event is within a predetermined distance from a location of the target electronic messaging space and determining that the current time is within the time range associated with the broadcast event.

In some embodiments, determining that the target electronic messaging space is visible in the broadcast can include performing image recognition analysis on the video broadcast to detect a visual identifier associated with the target electronic messaging space.

In some embodiments, determining that the target electronic messaging space is visible in the broadcast can include performing image recognition analysis on the video broadcast to determine the location depicted by the video broadcast and determining that a location associated with the target electronic messaging space is within a predetermined distance of the determined location depicted by the video broadcast.

Next, as shown at block 506, responsive to determining a location depicted by the video broadcast, the method includes determining a location of the target electronic messaging space and a message content displayed by the target electronic messaging space. For example, in some embodiments, messaging space server 410 may compare the location depicted by the video broadcast to the locations listed in the stored electronic messaging space data to determine a match (e.g., both locations are the same sports arena), or to determine that, for example, the locations are within a predetermined threshold distance from one another.

Next, as shown at block 508, the method includes causing the target electronic messaging space to modify the display of the message content for improved presentation via the video broadcast.

Figure 6B:
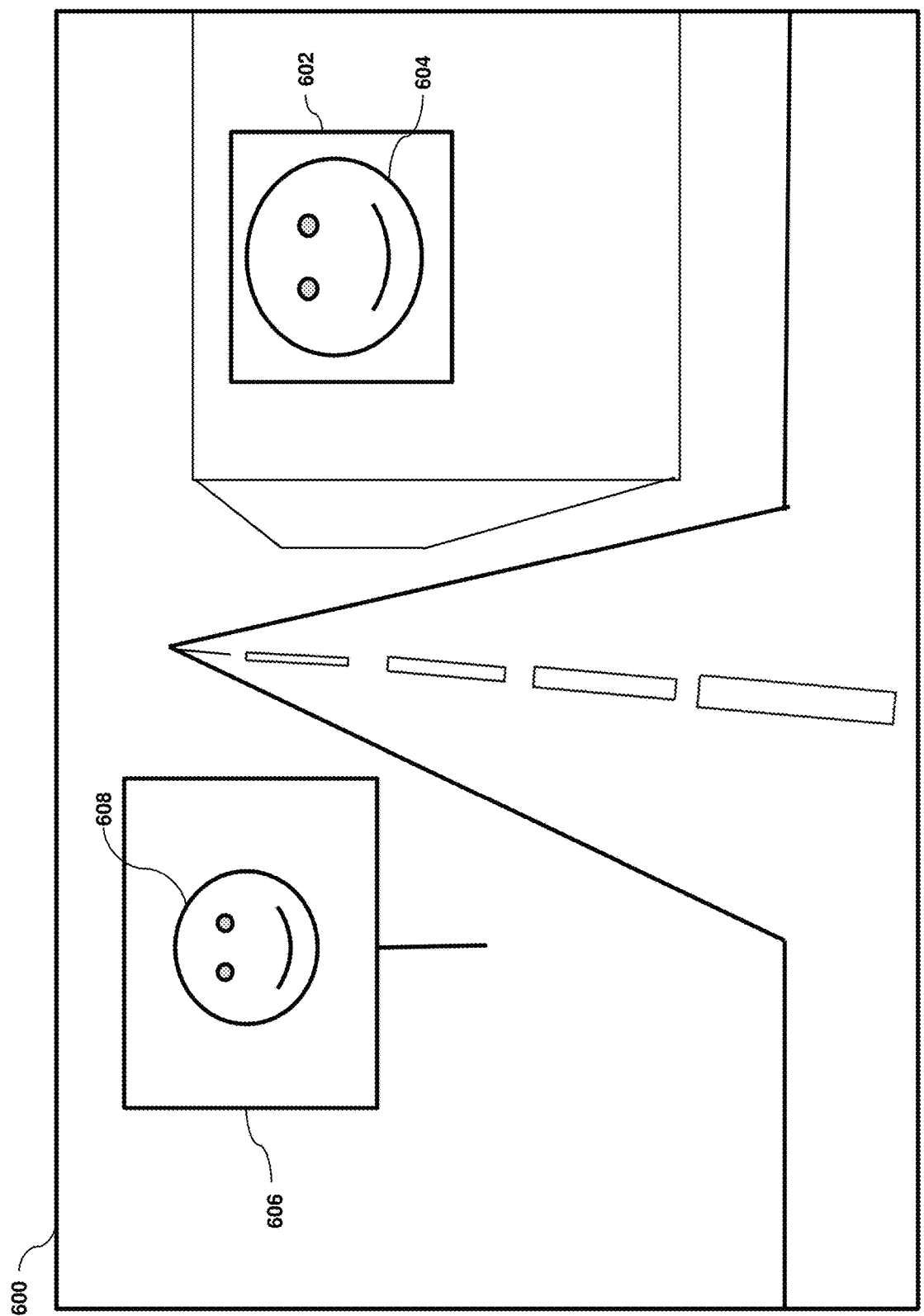
FIGS. 6B-6C depict exemplary modifications to the electronic messaging space to enhance the presentation of content in a video broadcast according to one or more embodiments of the invention.
Figure 6C:
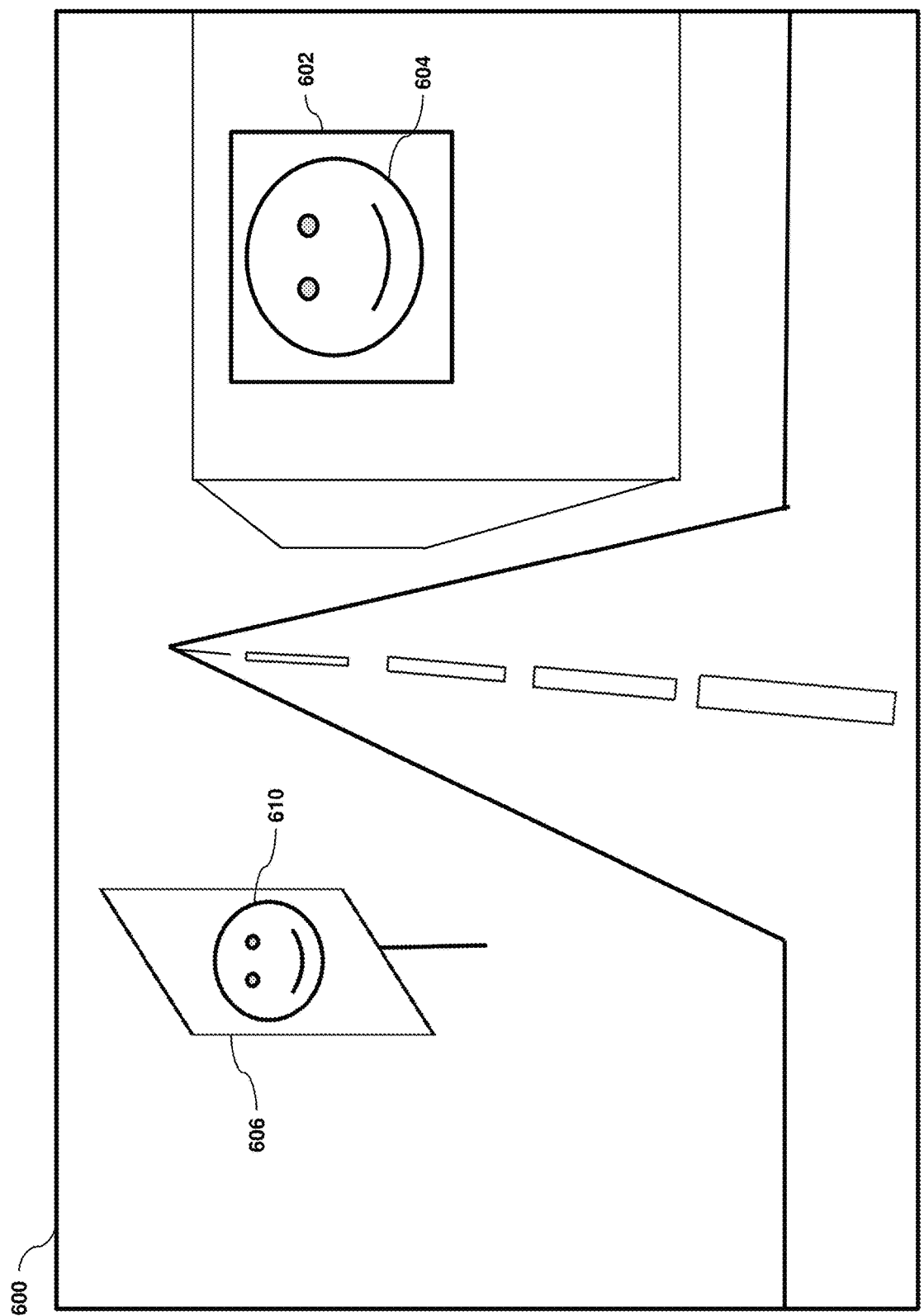

According to some embodiments, causing the target electronic messaging space to modify the display of the message content for improved presentation via the video broadcast can include adjusting the target electronic messaging space for improved presentation via the video broadcast and adjusting the message content displayed by the target electronic messaging space for improved presentation via the video broadcast. In some embodiments, adjusting the target electronic messaging space for improved presentation via the video broadcast can include one or more of rotating the target electronic messaging space and adjusting lighting associated with the target electronic messaging space. For example, as shown in FIG. 6B, the electronic messaging space 420 (e.g., second electronic messaging space 606) may be instructed by messaging space server 410 to rotate to face the camera, providing a more clear of the message content (e.g., second message content 608). In some embodiments, adjusting the message content displayed by the target electronic messaging space for improved presentation via the video broadcast can include one or more of adjusting the angle of the message content, adjusting the size of the message content, and modifying an image and/or text of the message content. For example, as shown in FIG. 6C, messaging space server 410 may instruct an electronic messaging space 420 (e.g., second electronic messaging space 606) to modify its presentation of message content (e.g., second message content 608) to display a modified message content (e.g., modified second message content 610) that is enhanced for viewing via the video broadcast. According to various embodiments, these techniques may be used independently from one another or in combination to generate enhanced viewing of the message content.

In some embodiments, causing the target electronic messaging space to modify the display of the message content for improved presentation via the video broadcast can include defining a first area of the target electronic messaging space and a second area of the target messaging space, causing the message content to be displayed in the first area in an unmodified manner and causing the message content to be displayed in the second area in a manner such that the message content is modified for improved display via the video broadcast. It is contemplated that changing the aspects of message content as illustrated by modified second message content 610 shown in FIG. 6C may cause individuals present at the location of the electronic messaging space to have a skewed view of the displayed content. Accordingly, in some embodiments, the display may be split into two portions, where one portion is modified for viewing in the video broadcast and the other portion is unmodified so that people who are physically present at the location of the electronic messaging space 420 may retain an unmodified view of the message content.

According to some embodiments, the method 500 may further include receiving user device information for one or more user devices displaying the video broadcast. Further, in some embodiments, causing the target electronic messaging space to modify the display of the message content for improved presentation via the video broadcast can include modifying the display of the message content for improved display on the one or more user devices.

In some embodiments, the method 500 may further include causing a sound to be played in association with the message content at the location of the target electronic messaging space, such that the sound is recorded and included as a part of the video broadcast. For example, in some embodiments, electronic messaging space 420 may include speakers that are capable of playing sounds that may be recorded by a microphone associated with a camera that is recording the video broadcast. Thus, in some embodiments, messaging space server 410 may cause electronic messaging space 420 to play a sound (e.g., timed in association with a video of the message content displayed by the electronic messaging space 420), that may subsequently be output on a viewer's television or user device.

Figure 7:
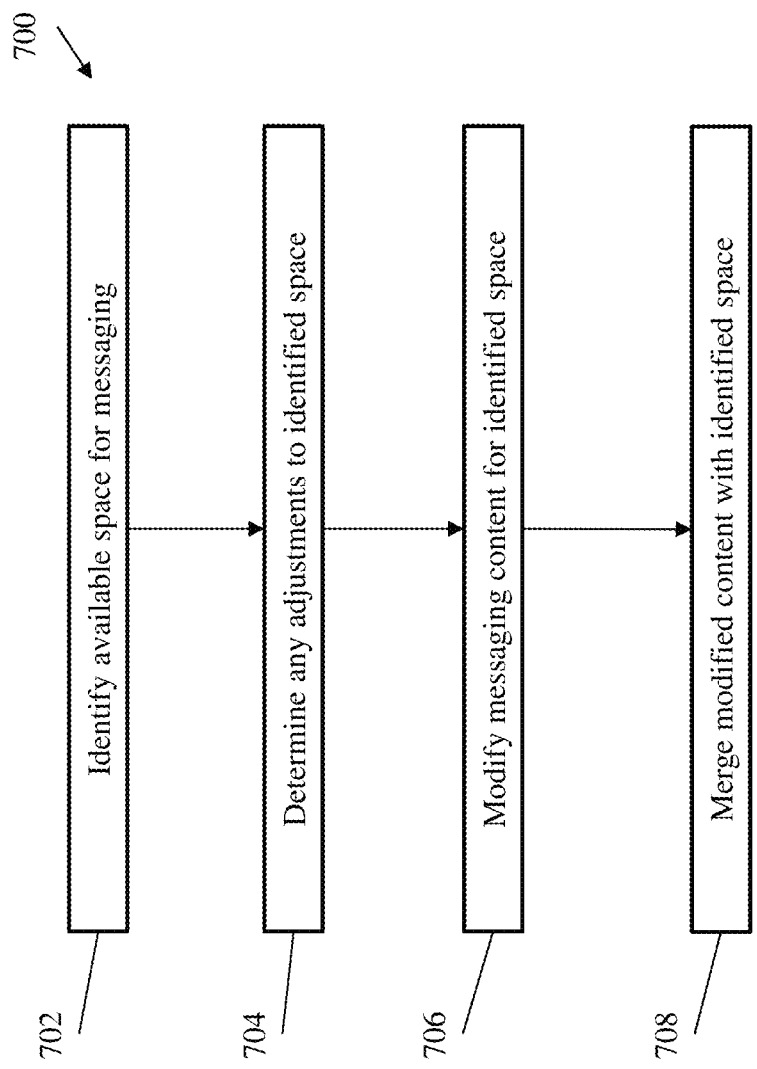
FIG. 7 depicts a flow diagram of a method for providing modifications to a messaging space to enhance presentation of content in a live or recorded video according to one or more embodiments of the invention.

FIG. 7 depicts a flow diagram of a method for providing modifications to a messaging space to enhance the presentation of content in a live or recorded video according to one or more embodiments of the invention. In one or more embodiments of the present invention, the method 700 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 700 begins at block 702 and includes identifying available space for messaging. According to some embodiments, identifying available space for messaging may include identifying one or more electronic messaging spaces 420 and/or non-electronic messaging spaces (e.g., a traditional billboard or sign) displayed in a video in a manner similar to that described previously above. Alternatively, for a recorded video (i.e., a video that is not broadcast live), the available space can be identified manually by a user inputting a selection of a space via a software program configured to allow a user to specify a selection of a messaging space. In some embodiments, identifying available space for messaging may include identifying messaging spaces that are owned or licensed for use by a particular person or organization or individual.

Next, as shown in block 704, the method 700 includes determining any adjustments to the identified available space for messaging. In some embodiments, identifying available space for messaging may include identifying space unused space adjacent to an identified messaging space. For example, in FIG. 6A, the wall space around the first electronic messaging space 602 may be considered unused space because it is a blank wall with no other words, images, designs or markings. Unused space may be determined using image analysis techniques, or may be manually selected by a user. Thus, according to some embodiments, the determining any adjustments to the identified space for messaging can include expanding the identified space to include surrounding unused space. Other adjustments may include normalizing the perceived visual angle of the identified space (e.g., changing the orientation of a messaging space relative to the line of sight of a camera in a manner similar to that described above with respect to FIG. 5 to orient the surface of the messaging space towards a position that is more perpendicular to the line of sight of the camera) and background adjustments (lighting, color, etc.).

Next, as shown in block 706, the method 700 includes modifying messaging content for use with the identified available space for messaging. For example, messaging content may be adjusted in terms of its size, color, shading, viewing angle, message background, readability, brightness, content and the like, in a manner similar to that previously described above. According to some embodiments, the messaging content may be increased in size to cover additional unused space that is associated with the identified messaging space. According to some embodiments, the messaging content may be modified for enhanced display based on the screen size of the type of user device (e.g., television, tablet, smartphone etc.) the video is to be viewed on.

Next, as shown in block 708, the method 700 includes merging the modified messaging content with the identified available space for messaging. According to some embodiments, the modified messaging content may be merged with the identified available space for messaging by electronically superimposing the modified messaging content on top of the identified available messaging space (and any additionally allotted surrounding unused space) in the video data. In other words, the original pixels in the video that show the identified available space for messaging can be overwritten with new pixels depicting the modified messaging content. Thus, in some embodiments, messaging space server 410 can generate the modified messaging content, transmit the modified messaging content to video broadcast server 430, and video broadcast server 430 can be configured to insert the modified messaging content into a video to replace the previous presentation of the identified available space for messaging. According to various embodiments, this may be performed during a live video broadcast or after the fact on a recorded video. This method may allow an owner (or licensee) of a messaging space, such as a billboard, to optimize the presentation of the messaging content on a live or replayed video.

According to some embodiments, including the methods shown in both FIGS. 5 and 7, the system can allow an owner/licensee of a messaging space to manage intellectual property rights in relation to the messaging space. For example, in some embodiments, messaging space server 410 can store representations of intellectual property such as logos, trademarks, images, videos, drawings the like, that are owned, licensed and/or registered by an owner or licensee of a messaging space. According to some embodiments, the system can allow for monitoring of intellectual property to ensure accurate usage by for example, determining that a target messaging space is visible in either a live or a recorded video, determining the owner/licensee of the messaging space, and comparing the representation of the intellectual property displayed by or superimposed upon the messaging space in the video to a stored copy of the intellectual property to determine whether it is being accurately represented or whether it has been displaced by other material (e.g., a competitor's images or messaging). For example, if a sporting event is originally broadcast showing a messaging space in the background of a video of the event that displays a company logo, the system can compare the logo as it is shown in the live video to a stored image of the logo to determine whether it is being accurately portrayed. If it is not, the system may modify the display of the logo by the electronic messaging space or superimposed over the video to correct it. The messaging space server 410 may save an indication of the use of the logo in association with the messaging space in the broadcast. If the sporting event is rebroadcast, based on the stored indication of the use of the logo in association with the messaging space in the broadcast, the messaging space server 410 may monitor the rebroadcast (e.g., using image recognition techniques) to determine whether the logo is properly displayed in the rebroadcast, or if, for example, another image or logo has been superimposed over the messaging space to obscure the logo. In the latter case, the system may notify the owner of the intellectual property that their intellectual property is not being accurately represented or is being obscured so that the owner may take appropriate actions. Similarly, the system can also monitor a live video broadcast that depicts a messaging space associated with the owner of the intellectual property to ensure that the intellectual property is being accurately represented and that no other unauthorized content has been superimposed over the messaging space to obstruct the display of the intellectual property. In this way, the system may allow an owner of intellectual property that is displayed by a messaging space that is recorded and shown in a video feed (either live or recorded), to monitor the representation of their intellectual property and for example, to prevent a re-broadcaster from superimposing other content (e.g., competitor messaging) over the intellectual property in a live broadcast or in a later broadcast recording of an event. Thus, in some embodiments, a modified image of messaging content may be compared with a pre-modified image of the messaging content to ensure the original content is being adequately represented. Furthermore, in the case of recorded or rebroadcast videos, the messaging content can be changed and updated more than once to, for example, update an advertisement with new information for a future viewing. Thus, in some embodiments, the system may allow the owner of the advertising space to change the content by for example, selling the space to a new user to present new content. For example, when a football game is aired live, the system may generate and display a first advertisement from a first licensee over the identified messaging space, however five years later, the owner of the messaging space may have leased the space to a second licensee and the messaging content may be changed such that recordings of the football game may now show a second messaging content from the second licensee. This system may enable licensees to specify for example, that a particular messaging space may never be licensed by a direct competitor so that, for example, an event that was originally sponsored by a first company via the messaging space may not be later overwritten with messaging from a direct competitor.

Additional processes may also be included. It should be understood that the processes depicted in FIGS. 5 and 7 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, via a messaging space server, electronic messaging space data, the electronic messaging space data comprising a location and a message content for each respective electronic message space among a plurality of electronic messaging spaces that are located at a physical location indicated by the location of the electronic messaging space data;
   determining, based on a video broadcast, that at least one visible electronic messaging space is visible in the video broadcast, the at least one visible electronic messaging space being one of the plurality of electronic messaging spaces located at the physical location;
   displaying the message content on the at least one visible electronic messaging space such that the message content is physically present and visible at the physical location;
   responsive to determining a broadcast location depicted by the video broadcast, determining a target electronic message space among the at least one visible electronic messaging space, and determining the physical location of the target electronic messaging space and the message content displayed by the target electronic messaging space; and
   causing the target electronic messaging space to modify a display of the message content for improved presentation via the video broadcast.

2. The computer-implemented method of claim 1, wherein determining that the target electronic messaging space is visible in the broadcast comprises:
   receiving a broadcast schedule comprising a list of scheduled broadcast events, each broadcast event being associated with a known location and time range;
   determining that a location of a broadcast event is within a predetermined distance from a location of the target electronic messaging space; and
   determining that a current time is within the time range associated with the broadcast event.

3. The computer-implemented method of claim 1, wherein determining that the target electronic messaging space is visible in the broadcast comprises performing image recognition analysis on the video broadcast to detect a visual identifier associated with the target electronic messaging space.

4. The computer-implemented method of claim 1, wherein determining that the target electronic messaging space is visible in the broadcast comprises:
   performing image recognition analysis on the video broadcast to determine the location depicted by the video broadcast; and
   determining that a location associated with the target electronic messaging space is within a predetermined distance of the determined location depicted by the video broadcast.

5. The computer-implemented method of claim 1, wherein causing the target electronic messaging space to modify the display of the message content for improved presentation via the video broadcast comprises:
   adjusting the target electronic messaging space for improved presentation via the video broadcast; and
   adjusting the message content present at the target location and displayed by the target electronic messaging space for improved presentation via the video broadcast.

6. The computer-implemented method of claim 5, wherein adjusting the target electronic messaging space for improved presentation via the video broadcast comprises one or more of rotating the target electronic messaging space and adjusting lighting associated with the target electronic messaging space.

7. The computer-implemented method of claim 5, wherein adjusting the message content displayed by the target electronic messaging space for improved presentation via the video broadcast comprises one or more of adjusting an angle of the message content, adjusting a size of the message content, and modifying an image and/or text of the message content.

8. The computer-implemented method of claim 1, further comprising:
   receiving user device information for one or more user devices displaying the video broadcast; and
   wherein causing the target electronic messaging space to modify the display of the message content for improved presentation via the video broadcast comprises modifying the display of the message content for improved display on the one or more user devices.

9. The computer-implemented method of claim 1, wherein causing the target electronic messaging space to modify the display of the message content for improved presentation via the video broadcast comprises:
   defining a first area of the target electronic messaging space and a second area of the target messaging space;
   causing the message content to be displayed in the first area in an unmodified manner; and
   causing the message content to be displayed in the second area in a manner such that the message content is modified for improved display via the video broadcast.

10. The computer-implemented method of claim 1, further comprising causing an sound to be played in association with the message content at the location of the target electronic messaging space, wherein the sound is recorded and included as a part of the video broadcast.

11. A system comprising:
    a processor communicatively coupled to a memory, the processor configured to:
    receive electronic messaging space data, the electronic messaging space data comprising a location and a message content for each respective electronic message space among a plurality of electronic messaging spaces that are located at a physical location indicated by the location of the electronic messaging space data;
    determine, based on a video broadcast, that at least one visible electronic messaging space is visible in the video broadcast, the at least one visible electronic messaging space being one of the plurality of electronic messaging spaces located at the physical location;
    displaying the message content on the at least one visible electronic messaging space such that the message content is physically present and visible at the physical location;
    responsive to determining a broadcast location depicted by the video broadcast, determine a target electronic message space among the at least one visible electronic messaging space, and determining the physical location of the target electronic messaging space and the message content displayed by the target electronic messaging space; and
    cause the target electronic messaging space to modify a display of the message content for improved presentation via the video broadcast.

12. The system of claim 11, wherein determining that the target electronic messaging space is visible in the broadcast comprises:
    receiving a broadcast schedule comprising a list of scheduled broadcast events, each broadcast event being associated with a known location and time range;
    determining that a location of a broadcast event is within a predetermined distance from a location of the target electronic messaging space; and
    determining that a current time is within the time range associated with the broadcast event.

13. The system of claim 11, wherein determining that the target electronic messaging space is visible in the broadcast comprises performing image recognition analysis on the video broadcast to detect a visual identifier associated with the target electronic messaging space.

14. The system of claim 11, wherein causing the target electronic messaging space to modify the display of the message content for improved presentation via the video broadcast comprises:
    adjusting the target electronic messaging space for improved presentation via the video broadcast; and
    adjusting the message content present at the target location and displayed by the target electronic messaging space for improved presentation via the video broadcast.

15. The system of claim 14, wherein adjusting the target electronic messaging space for improved presentation via the video broadcast comprises one or more of rotating the target electronic messaging space and adjusting lighting associated with the target electronic messaging space.

16. The system of claim 14, wherein adjusting the message content displayed by the target electronic messaging space for improved presentation via the video broadcast comprises one or more of adjusting an angle of the message content, adjusting a size of the message content, and modifying an image and/or text of the message content.

17. A computer program product comprising a computer readable storage medium having program instructions embodied therewith the program instructions executable by a computer processor to cause the computer processor to perform a method comprising:
    receiving, via a messaging space server, electronic messaging space data, the electronic messaging space data comprising a location and a message content for each respective electronic message space among a plurality of electronic messaging spaces that are located at a physical location indicated by the location of the electronic messaging space data;
    determining, based on a video broadcast, that at least one visible electronic messaging space is visible in the video broadcast, the at least one visible electronic messaging space being one of the plurality of electronic messaging spaces located at the physical location;
    displaying the message content on the at least one visible electronic messaging space such that the message content is physically present and visible at the physical location;
    responsive to determining a broadcast location depicted by the video broadcast, determining a target electronic message space among the at least one visible electronic messaging space, and determining a physical location of the target electronic messaging space and the message content displayed by the target electronic messaging space; and
    causing the target electronic messaging space to modify a display of the message content for improved presentation via the video broadcast.

18. The computer program product of claim 17, wherein determining that the target electronic messaging space is visible in the broadcast comprises:
- receiving a broadcast schedule comprising a list of scheduled broadcast events, each broadcast event being associated with a known location and time range;
- determining that a location of a broadcast event is within a predetermined distance from a location of the target electronic messaging space; and
- determining that a current time is within the time range associated with the broadcast event.

19. The computer program product of claim 17, wherein determining that the target electronic messaging space is visible in the broadcast comprises performing image recognition analysis on the video broadcast to detect a visual identifier associated with the target electronic messaging space.

20. The computer program product of claim 17, wherein causing the target electronic messaging space to modify the display of the message content for improved presentation via the video broadcast comprises:
- adjusting the target electronic messaging space for improved presentation via the video broadcast; and
- adjusting the message content present at the target location and displayed by the target electronic messaging space for improved presentation via the video broadcast.

* * * * *